(12) United States Patent
Keduka et al.

(10) Patent No.: US 7,488,169 B2
(45) Date of Patent: Feb. 10, 2009

(54) THREE-DIMENSIONAL STRUCTURE AND METHOD AND APPARATUS FOR MANUFACTURE THEREOF

(75) Inventors: Seijyu Keduka, Yokohama (JP); Hajime Kawakami, Nagoya (JP)

(73) Assignee: Kawakami Sangyo Co., Ltd., Aichi (JP)

( * ) Notice: Subject to any disclaimer, the term of this patent is extended or adjusted under 35 U.S.C. 154(b) by 660 days.

(21) Appl. No.: 10/546,224

(22) PCT Filed: Feb. 19, 2004

(86) PCT No.: PCT/JP2004/001893

§ 371 (c)(1),
(2), (4) Date: Aug. 17, 2005

(87) PCT Pub. No.: WO2004/073958

PCT Pub. Date: Sep. 2, 2004

(65) Prior Publication Data

US 2006/0083807 A1 Apr. 20, 2006

(30) Foreign Application Priority Data

Feb. 19, 2003 (JP) ............................ 2003-083871

(51) Int. Cl.
*B30B 9/00* (2006.01)
*B28B 5/00* (2006.01)
(52) U.S. Cl. .................. 425/396; 425/394; 264/299
(58) Field of Classification Search ............... 264/320; 425/396, 394, 57, 59, 185, 110, 371, 369, 425/370, 336, 443; 100/43; 74/53, 54, 55, 74/56, 57
See application file for complete search history.

(56) References Cited

U.S. PATENT DOCUMENTS 3,905,290 A * 9/1975 Caughey ..................... 100/215
3,955,019 A 5/1976 Keith (Continued)

FOREIGN PATENT DOCUMENTS

JP 48-75678 10/1973

(Continued)

*Primary Examiner*—Eric Hug
*Assistant Examiner*—Saeed M Huda
(74) *Attorney, Agent, or Firm*—Jordan And Hamburg LLP

(57) ABSTRACT

A three-dimensional structure, and a method and device for producing the structure, where the structure has pressure resistant characteristics despite its voluminous and elastic nature and has higher resistance to surface wear and mechanical dimensional stability than a foamed polyethylene sheet. The three-dimensional structure is characterized in that a resin sheet has needle-like projections on its both faces, each projection has a height (H) of 3 mm or more, the height (H) and a width (W) of the projection at the height of H/2 has a relationship of H≧2.5 W, the projection has a hole in its tip, and the projections are joined to a sheet-like object at their tops. The method of producing the three-dimensional structure is characterized in that a large number of needle-like dies are integrated with a base plate, and a pair of the base plates are arranged so as to be opposed to each other, and a resin sheet is deformed when the pair of the base plates move parallel to each other so as to intrude into the resin sheet. Further, a method of continuously producing the three-dimensional structure is provided.

5 Claims, 11 Drawing Sheets

U.S. PATENT DOCUMENTS

| | | | |
|---|---|---|---|
| 3,963,813 A | * | 6/1976 | Keith .................. 264/167 |
| 4,025,599 A | | 5/1977 | Keith |
| 4,824,354 A | * | 4/1989 | Keaton .................. 425/345 |

FOREIGN PATENT DOCUMENTS

| | | |
|---|---|---|
| JP | 62-15330 | 4/1987 |
| JP | 5-12139 | 2/1993 |
| JP | 2000-017091 | 1/2000 |
| JP | 2001-9908 | 1/2001 |

* cited by examiner

THREE-DIMENSIONAL STRUCTURE AND METHOD AND APPARATUS FOR MANUFACTURE THEREOF

FIELD OF THE INVENTION

The present invention relates to a three-dimensional structure made from a resin and a method for the manufacture thereof, and more particularly to a three-dimensional structure that excels in pressure resistance despite having flexibility and also has water permeability and thermal insulation properties and to a method and apparatus capable of manufacturing such a three-dimensional structure in an easy manner and with good productivity.

BACKGROUND OF THE INVENTION

A variety of three-dimensional structures having protrusions formed on both sides of a resin sheet have been suggested (JP-B-S62-15330, JP-B-H5-12139, etc.). However, the suggested structures have a high rigidity; in particular those with a thickness (height of three-dimensional structure) exceeding 6 mm, cannot be wound into large rolls, and are unsuitable for applications in the form of sheet materials that are effective when a large surface area is needed. In the structure with both side protrusions described in JP-B-S62-15330, because the tip portions of the protrusions are flat and portions thereof are not deformed, the thickness is large, no contribution is made to increasing the compressive strength, and an unnecessarily large amount of valuable resources are used. Moreover, when the structure is thermally melted to joint to other sheets, a large amount of thermal energy is needed for melting. The resultant drawback is that thin portions on the protruding side surfaces are deformed by this extra heat. Yet another undesirable feature of the structure with flat tip portions, which is described in the aforementioned reference, is that because the compressive strength increases with the number of protrusions, the number of protrusions cannot be increased. Moreover, because the tip portions of protrusions are flat, the flexibility of the structure is lost accordingly.

Manufacturing a three-dimensional structure with protrusions on both sides from a resin sheet with both side embossed rolls, as suggested in JP-B-H5-12139, requires a pulling-out angle. Therefore, the molding process places limitations on the pitch and height of the projections obtained by embossing and a structure with high needle-like protrusions cannot be obtained with a small pitch. Furthermore, needle-like protrusions can be also manufactured by electric discharge processing (JP-A-2000-17091), but the absolute height of the peaks cannot be increased. Furthermore, because only one surface can be processed in one cycle of processing, a structure with protrusions on both sides is difficult to manufacture. A resin three-dimensional structure with protrusions on both sides can be also manufactured by injection molding with dies, but because the moldings have to be pulled out from the dies, deep valleys cannot be manufactured. Moreover, the resin sometimes cannot be processed to obtain thin sections of the tips, continuous sheets cannot be molded, die manufacturing cost is high due to a complex shape, and the production cost becomes high.

Furthermore, foamed sheets from polyethylene resin are used as flexible bulky structures, but the sheets foamed to high bulkiness have a low compressive strength, poor water permeability, low resistance to surface wear, and poor mechanical dimensional stability. Therefore, there is a need for a flexible and bulky material that is air and liquid permeable and has a high compressive strength and good mechanical dimensional stability. Furthermore, even with foamed polyethylene sheets, a product with a thickness of 5 mm or more is technologically difficult to produce, therefore sheets with such a thickness are obtained by joining together thick foamed sheets. However, in this case, the amount of work is doubled and because cooling the intermediate sections in the joining process requires time and the line speed is low, the production efficiency is poor.

DISCLOSURE OF THE INVENTION

Problems to be Solved by the Invention

The present invention was created to overcome the above-described drawbacks of the conventional technology and it is an object thereof to provide a three-dimensional structure that has pressure resistance capability despite being bulky and flexibility, and a method for the manufacture of such a three-dimensional structure. It is another object of the present invention to provide a method enabling the continuous and low-cost manufacture of the three-dimensional structure in accordance with the present invention and an apparatus therefore. Yet another object of the present invention is to provide a bulky sheet having surface friction resistance and mechanical dimensional stability, despite having large bulkiness and thermal insulation properties, this sheet having properties superior to those of foamed sheets. It is still another object of the present invention to provide a filter, a drainage material, a thermally insulating material, and a buffer material that are air permeable, water permeable, and flexible, but also have compressive strength and mechanical dimensional stability.

Means to Solve the Problems

The present invention was created to attain the above-described objects, and the features of the three-dimensional structure according to the present invention are described below. The present invention relates to a three-dimensional structure in which needle-like protrusions formed by deforming parts of a resin sheet are present on both sides of the resin sheet, the height H of the protrusions is 3 mm or more, and the width W at ½ H is H>2.5 W. The present invention also relates to a three-dimensional structure, wherein the cross section of the tips of the needle-like protrusions has a curve with a curvature radius of 5 mm or less. The present invention also relates to a three-dimensional structure, wherein the tip of each needle-like protrusion is flat. The present invention also relates to a three-dimensional structure, wherein a hole is present in the tip of the needle-like protrusions. The present invention also relates to a three-dimensional structure, wherein sheet-like objects are joined to the tips of the needle-like protrusions. Furthermore, the present invention also relates to a filter or drainage material, wherein cavities in the three-dimensional structure are filled with fibrous substance.

The features of the manufacturing method according to the present invention are described below. The present invention relates to a method for the manufacture of a three-dimensional structure, wherein a pair of substrates having integrated therewith multiple needle-like dies with a protrusion height h of 3 mm or more and a width w at ½ h such that h>3 w are disposed opposite each other so as to face a resin sheet having flowability at a deflection temperature under load of the resin or above it, the resin sheet is deformed by moving the needle-like dies of the pair of substrates parallel to each other so as to thrust the resin sheet, and the sheet is cooled or solidified, while maintaining the deformed state thereof. The present invention also relates to a method for the manufacture of a three-dimensional structure, wherein a multiplicity of the substrates are linked together and fixed to continuously circulating conveyors, a pair of the conveyors are disposed opposite each other, the resin sheet heated to a temperature equal to or higher than the deflection temperature under load is continuously inserted between a pair of continuously circulating conveyors, and protrusions are formed on both sides of the resin sheet by causing the pairs of needle-like dies to thrust the resin sheet with a mechanism for moving the substrates in the direction perpendicular to the resin sheet. Furthermore, the present invention also relates to a method for the manufacture of a three-dimensional structure, wherein the tips of the needle-like protrusions provided on both sides of the three-dimensional structure are pressed against a heating roll to form a hole in each tip of the needle-like protrusions.

The features of the manufacturing apparatus according to the present invention are described below. The present invention relates to an apparatus for the manufacture of a three-dimensional structure, so configured that the conveyors comprise caterpillars, the substrates are fixed to vertical pins standing on the caterpillars, and the vertical movement is carried out by guiding the substrate support pins provided on the surface of the substrate with a grooved cam. The present invention also relates to an apparatus for the manufacture of a three-dimensional structure, so configured that separation plates are provided on the surface of the substrates and the substrates and the molded resin sheet are continuously separated by guiding the separation plate support pins provided on the side surface of the separation plates with a grooved cam. The present invention also relates to an apparatus for the manufacture of a three-dimensional structure, so configured that pins are provided in a vertical condition on the conveyors, the substrates are fixed to the conveyors by passing the pins into holes provided in the substrates, and the vertical movement of the substrates is carried out with stands provided on both side surfaces of the conveyors.

A specific feature of the present invention is that needle-like protrusions are formed on both sides of a resin sheet. Thermoplastic resin, for example, polyolefine such as polyethylene and polypropylene, polycarbonate, polyamide resin such as Nylon 6 and Nylon 66, polyester such as polyethylene terephthalate and polybutylene terephthalate, vinyl resin such as polyvinyl chloride, polystyrene resin, acrylic resin such as methyl acrylate resin, fluorocarbon resin such as tetrafluoroethylene, and a polyvinyl alcohol can be advantageously used as the aforementioned resin. A thermosetting resin such as epoxy resin, phenolic resin, and urea resin can be used, provided it has flowability at temperature equal to or above the below-described deflection temperature under load. Furthermore, those resins can be used not only individually, but also after they are combined together, e.g., by blending, or after an additive such as plasticizer, filler, antioxidant, stabilizer, and lubricant is added thereto. When the present invention is used for civil engineering, degradable resins, for example, biodegradable resins such as polylactic acid-based resins or polybutylene succinate or photodecomposable resins such as vinyl ketone polymers are preferred. The present invention can also provide a soft three-dimensional structure and thermoplastic elastomers such as SBS and polyurethanes can be also used.

In accordance with the present invention, needle-like protrusions formed by deforming parts of a resin sheet are present. The "sheet" as referred to herein is obtained by forming the resin so that it assumes a sheet-like shape. No specific limitation is placed on the sheet thickness and the term "sheet" also includes the products usually called films or membranes, but the thickness is preferably 10 µm or more to 2 mm or less, more preferably 50 µm or more to 1 mm or less, and most preferably 100 µm or more to 0.5 mm or less. This is because stable molding is difficult when the thickness is less than 10 µm or more than 2 mm.

The present invention features a three-dimensional structure in which needle-like protrusions formed by deforming parts of a resin sheet are present on both sides of the resin sheet. The presence of protrusions on both sides can increase bulkiness and provide a structure with large cavities and also to provide a structure with good thermal insulation properties. Furthermore, the presence of protrusions on both sides also increases flexibility. Another advantage of the structures having protrusions on both sides is that when such structures are rolled into large rolls, the protrusions of the upper layer and the protrusions of the lower layer can penetrate between the protrusions of the opposite layer. Therefore, even though one layer has a large thickness, a compact roll can be obtained. Moreover, because the structure has front-back symmetry, no warping occurs even when, e.g., resin sheets are joined to both sides. The three-dimensional structure as referred to herein means a spatial structure having protrusions on both sides of a flat sheet-like object.

A specific feature of the needle-like protrusions in accordance with the present invention is that the height H thereof is 3 mm or more. The height H of the protrusions is 3 mm or more to preferably 200 mm or less, more preferably 5 mm or more to 100 mm or less, and most preferably 8 mm or more to 50 mm or less. When the thickness is less than 3 mm, the bulkiness required for the three-dimensional structure in accordance with the present invention cannot be attained, and when the height is more than 200 mm, long thin protrusions by the present invention are sometimes difficult to manufacture with good stability. Therefore, because the three-dimensional structure by the present invention has protrusions on both sides, a structure having a thickness of at least 6 mm can be obtained. Furthermore, the width W in a position at half of the height H of the protrusions in accordance with the present invention satisfies the condition H>2.5 W. The capability of increasing the height H with respect to W is a specific feature of the present invention. The width W satisfies the condition H>2.5 W and preferably H<100 W, more preferably H>3 W to H<70 W, and most preferably H>5 W to H<50 W. Those ranges are selected because a structure with increased bulkiness and cavity ratio and also good flexibility can be obtained. When H<2.5 W, the bulkiness required for the three-dimensional structure in accordance with the present invention cannot be obtained, and when H>100 W, long thin protrusions in accordance with the present invention are sometimes difficult to manufacture with good stability. The term protrusions do not necessarily mean only conical symmetrical shape, and the cross section in the width W direction can be of a variety of shapes, including elliptical, quadrangular, or triangular shapes. In those cases, the smallest width in the cross section at ½ H is used as the value of W. Furthermore, H and W are found by measuring the protrusions in randomly selected 30 points and finding an arithmetic average. The above-described requirements relating to a three-dimensional structure are the requirements relating to a "product" and all the above-described requirements are not necessarily applicable to the products manufactured by the below described manufacturing method or manufacturing apparatus.

The number of the needle-like protrusions employed by the present invention mainly depends on the value of W employed in accordance with the present invention, and a specific feature of the present invention is that a large number of the needle-like protrusions can be provided because W is less than the height of the protrusions. A large number of needle-like protrusions mean an accordingly high compressive strength, and a small W and a large H mean a high flexibility. Therefore, the three-dimensional structure in accordance with the present invention is a flexible structure that has a high compressive strength.

A specific feature of the three-dimensional structure in accordance with the present invention is that the tips of the needle-like protrusions have a curved surface and the cross section thereof preferably has a curve with a curvature radius of 5 mm or less, more preferably 0.01 mm to 2 mm, and most preferably 0.1 mm to 1 mm. With the curvature radius more than 5 mm, the deformation of the tip portions is insufficient, the protrusions are too thick, and flexibility is most often insufficient. When the curvature radius of the tip portions is 5 mm or less, the tip portions can be deformed, excess thickness of the tip portions is reduced, and surface area of the tip portions is decreased, thereby increasing flexibility. Furthermore, the reduction in the surface area of the tip portions makes it possible to increase the number of protrusion.

The tips of the needle-like protrusions in the three-dimensional structure in accordance with the present invention also can be flat. The flat tips may be formed in the molding process, but flattening can be also carried out by heating and pressing the tips after the three-dimensional structure has been molded. For example, in the case where the three-dimensional structure in accordance with the present invention is adhesively joined to other sheets, forming flat tips sometimes can be expected to increase the joining strength due to increased joining area. The flat portions may have the same thickness as the starting resin sheet, but it is preferred that the thickness be changed so as to be less than the thickness of the original resin sheet.

The three-dimensional structure in accordance with the present invention can have a structure in which holes are present in the tip portions of the needle-like protrusions. In accordance with the present invention, because the needle-like protrusions are present on both sides, the structure has high air and water permeability in the in-plane direction, but air and water permeability are sometimes required in the direction through the plane. Providing holes in the tip portions of the needle-like protrusions ensures such air and water permeability in the direction through the plane. Furthermore, a porous three-dimensional structure with a specific configuration that has not heretofore been known can be obtained. Thus, a filtering function can be provided by passing the air or water through the structure in accordance with the present invention in which spaces of the protrusions are filled with a fibrous substance or filler and a multilayer configuration is obtained. Moreover, if a reaction enhancer is provided in or a catalytic action is imparted to the fibrous substance or filler, the structure in accordance with the present invention can be also used in a reaction tank such as a purification tank for contaminated water. The advantage of such a structure is that the reaction time can be shortened. No specific limitation is placed on the shape and size of the aforementioned holes and they can be determined according to application.

A mechanical piercing method, means for heating only the tip portions, e.g., with rolls heated to a high temperature, in a state in which the tip portions are deformed with needle-like dies of an apparatus, and a method of forming resin protrusion and then slicing out only the tip sections can be used to produce the holes in the tips of the needle-like protrusions. When rolls heated to high temperature are used, the roll temperature is preferably equal to or higher than the melting point of the resin sheet or the glass transition temperature when noncrystalline resin is employed. It is even more preferred that the roll temperature be equal to or higher than the thermal decomposition temperature of the resin.

The three-dimensional structure in accordance with the present invention can be a structure in which sheet-like objects are joined to the tips of the needle-like protrusions. Thermal insulation capability can be provided by spaces formed inside the layered configuration of the structure and sheets. Furthermore, dimensional stability is improved and because movement of needle-like protrusions in the lateral direction is inhibited, the compressive strength is also increased. Sheet-like substances to be joined to the three-dimensional structure are not limited to the resin sheets identical to the sheet for forming the three-dimensional structure in accordance with the present invention and can be a material having air and water permeability such as cloth, knitted material, nonwoven fabric, net, and paper or metal, e.g., aluminum foil, or ceramic sheet when heat resistance is required. A perforated film can be advantageously used for the resin sheet when air or water permeability is required. Joining an air-permeable sheet makes it possible to obtain the so-called "breathing thermally-insulating board". Furthermore, using material that passes practically no air, but can be permeated by water vapors makes it possible to obtain a three-dimensional structure having dew condensation prevention ability. As a result, the prickly feeling such as demonstrated by glass wool is prevented and the product can be reused as resin. Therefore, the environmental burden is low. As an example of joining methods suitable for above-described cases, when a resin sheet is employed, it can be heated and melted and then brought into contact with the tips of the needle-like protrusions of the three-dimensional structure and the tip portions of the needle-like protrusions can be melted by heat capacity of the melted resin sheet and joined. Furthermore, joining and adhesive bonding can be also conducted after applying an adhesive such as a hot-melt adhesive or an emulsion adhesive to the sheet-like object or tips of the three-dimensional structure.

Filling the cavities of the three-dimensional structure in accordance with the present invention makes it possible to obtain a structure having a function of a filter or drainage material. Because the three-dimensional structure in accordance with the present invention has large cavities and a high compressive strength, filling the cavities with a fibrous substance to a low filling density makes it possible to obtain a filter or drainage material with a small loss of air or water permeability. In this case, a structure in which sheet-like objects are joined to the tips of the needle-like protrusions is especially preferred.

The three-dimensional structure in accordance with the present invention can be manufactured, for example, by disposing a pair of substrates having integrated therewith multiple needle-like dies so that the substrates are opposite each other and face a resin sheet that is at a deflection temperature under load of the resin or above it and, therefore, has flowability, deforming the resin sheet by moving the needle-like dies of the pair of substrates parallel to each other so as to thrust the resin sheet, and cooling or solidifying, while maintaining the deformed state. The deflection temperature under load of the resin is determined according to JIS K7207; it is also called a "thermal deformation temperature". The deflection temperature under load as employed in accordance with the present invention is determined by a B method, that is, a method in which a bending stress applied to a sample is 45.1 N/cm2. When the temperature of the resin sheet is equal to or higher than the resin deflection temperature under load, the resin sheet can be deformed to obtain the needle-like protrusions. The temperature of the resin sheet is preferably 30° C. or more, more preferably 50° C. or more, and most preferably 80° C. or higher than the deflection temperature under load.

The deformation is possible even when the deflection temperature under load is not reached, but in this case the deformation takes long time and productivity is poor. Resin sheets are sometimes softened not by thermal effects, but by chemical softening, e.g., with aqueous solvent in the case of polyvinyl alcohol or with solvent and plasticizer, as in the case of plasticizers in polyvinyl chloride resins, but in those cases, the resin sheet is also required to be at temperature equal to or higher than the deflection temperature under load.

The needle-like dies for deforming the resin sheet in the manufacturing method in accordance with the present invention preferably has a protrusion height h of 3 mm or more and a width w at ½ h such that h>3 w. Such a shape of the needle-like dies makes it possible to realize thin elongated needle-like protrusions and to obtain a three-dimensional structure in accordance with the present invention that is flexible, but also has pressure resistance. The needle-like dies have a height of 3 mm or more to preferably 200 mm and less, more preferably 5 mm or more to 100 mm or less, and most preferably 8 mm or more to 50 mm or less. When the height is less than 3 mm, sufficient bulkiness of the three-dimensional structure in accordance with the present invention cannot be obtained, and when it is more than 200 mm, long thin protrusions in accordance with the present invention are sometimes difficult to manufacture with good stability. Furthermore, the width w in a position at ½ the height h of the needle-like dies is such that h>3 w, preferably to h<100 w, more preferably h>5 w to h<70 w, and most preferably h>10 w to h<50 w. Those ranges are selected because a structure with increased bulkiness and cavity ratio and also good flexibility can be obtained. When h<3 w, the bulkiness required for the three-dimensional structure in accordance with the present invention cannot be obtained, and when h>100 w, long thin protrusions in accordance with the present invention are sometimes difficult to manufacture with good stability. The term "needle-like dies" does not necessarily mean only conical symmetrical shape, and the cross section in the width w direction can be of a variety of shapes including elliptical, quadrangular, or triangular shapes. In those cases, the smallest width in the cross section at ½ h is used as the value of w. Furthermore, h and w are found by measuring the protrusions in randomly selected 30 points and finding an arithmetic average.

Multiple needle-like dies in accordance with the present invention are integrated with substrates. The integration may be attained by integrally mechanically processing them of the same workpiece, but the needle-like dies may be also joined to the substrate with various means such as screwing, welding, and adhesive bonding. One more advantage of the thin long needle-like dies in the manufacturing method in accordance with the present invention is that when the multiple needle-like dies are disposed in pairs opposite each other, no mechanical accuracy is required between the needle-like dies facing each other. The test results confirmed that when the needle-like dies of a pair of substrates move parallels each other so as to thrust the resin sheet; they thrust the resin sheet, without interference between the needle-like dies facing each other. Yet another advantage of the thin long needle-like dies in accordance with the present invention is that because they have a needle-like shape, both the thin long needle-like dies of the apparatus and the needle-like protrusions of the product demonstrate good cooling effect due to low thermal capacity thereof and the productivity is high. Furthermore, not only the shape, but also a molecular orientation governed by deformation during melting, which is employed during molding, produces a large effect on the increase in compressive strength. Yet another specific feature of the present invention is that molecular orientation can be increased due to a high deformation ratio and a strong cooling effect.

Means for continuously manufacturing the three-dimensional structure in accordance with the present invention will be explained below. A multiplicity of the substrates with the needle-like dies fixed thereto are linked together and fixed to continuously circulating conveyors. A pair of the conveyors are disposed opposite each other, and a resin sheet heated to a temperature equal to or higher than the deflection temperature under load is continuously inserted between the pairs of continuously circulating conveyors. The resin sheet is thrust with pairs of needle-like dies by using a mechanism for moving the substrates in the direction perpendicular to the resin sheet and protrusions are formed on both sides of the resin sheet, thereby continuously molding a three-dimensional structure. With the conventional method in which a resin sheet is directly sandwiched between continuously moving conveyors, because the needles of the needle-like dies in accordance with the present invention have a large length, they are stick obliquity when the resin sheet is sandwiched, and stable molding is impossible. In accordance with the present invention, this problem is resolved by moving the substrates perpendicularly to the resin sheet when the sheet is sandwiched. Various means can be used to implement the vertical movement of the substrates, and the substrates only may be moved vertically or they may be integrated and moved together with the conveyors. The substrates located on both conveyors or only substrates located on one conveyor can be moved vertically.

Examples of the mechanisms for moving the substrates in the vertical direction when the three-dimensional structure in accordance with the present invention is continuously manufactured include two following mechanisms. One mechanism is means using caterpillars as the conveyors and moving the substrates perpendicularly to the resin sheet, which is inserted therebetween, by guiding the substrates by the grooves of a grooved cam. Another means comprises pushing up or down only the substrates located on the conveyors. Those means are described in details in description of the preferred embodiment for implementing the present invention.

Advantageous Effect of the Invention

The present invention features a three-dimensional structure in which needle-like protrusions formed by deforming parts of a resin sheet are present on both sides of the resin sheet. Therefore, producing a three-dimensional structure comprising fine needle-like protrusions makes it possible to obtain a structure that has characteristics of a three-dimensional structure with pressure resistance, while being a three-dimensional structure with a large cavity. Because a small amount of resin is used, resources are saved, no valuable resources are used in vain, and environmental burden during waste treatment is small. Other performance features include lightness in weight and high thermal insulation capability. The bulkiness and lightness in weight of the three-dimensional structure have been conventionally attained with foamed bodies, but low surface resistance and poor air and water permeability were the drawbacks of foamed bodies. The present invention provides a three-dimensional structure that differs in the form thereof from foamed bodies, thereby overcoming the aforementioned drawbacks.

Furthermore, because the present invention provides a three-dimensional structure which, as described hereinabove, comprises fine needle-like protrusions, this structure features flexibility, while having the properties of a pressure-resistant three-dimensional structure. Good flexibility makes it possible to wind directly a long product produced in a continuous mode and offers many advantages in terms of production and usage characteristics at an installation site or the like. The conventional three-dimensional structures have a large thickness, cannot be wound, and require extra processes such as cutting. Moreover, because they are used in various dimensions, the amount of wasted material is large. Flexibility as referred to herein is a relative property and means that a structure can be obtained that is relatively flexible in comparison with the conventional three-dimensional structures, even if a hard resin such as hard polyvinyl chloride resin or polycarbonate resin is used. Furthermore, because the present invention provides for a high deformation ratio during molding and good cooling efficiency, the molecular orientation of the molded product is good and a product with a high compressive strength can be obtained. Furthermore, if a three-dimensional structure in accordance with the present invention is molded from a sheet obtained by kneading titanium oxide demonstrating a photocatalystic action or active carbon demonstrating deodorizing performance and molding into a sheet, a product with a large surface area is obtained due to a high deformation ratio and the properties of the titanium oxide or active carbon can be effectively demonstrated.

Flexibility and pressure resistance of the three-dimensional structure in accordance with the present invention make it possible to use it as a packaging material or cushion material for precision instrument and the like. It also has properties necessary for packaging materials, such as lightness in weight and resistance to water. Because of air and water permeability in the direction of sheet surface and pressure resistance in the direction perpendicular to the surface, the laminates of a plurality of three-dimensional structures in accordance with the present invention can be used for water curing materials, filters, drainage materials, and the like. Furthermore, products obtained by joining a nonwoven fabric, a cloth, a net, or film to the tips of the needle-like protrusions of the three-dimensional structure in accordance with the present invention can be used for partition wall, thermal insulating material, soft ground reinforcing material for civil engineering, water curing material, and the like. Moreover, products obtained by filling the spaces between the needle-like protrusions in accordance with the present invention with a fibrous substance and, if necessary, joining the tips of the needle-like protrusion to sheet-like objects can be used for thermally insulting boards, filters, sewage treatment sheet, floors in shed for animal, and human-waste treatment plant.

Because of a large length of needles, the three-dimensional structure in accordance with the present invention cannot be continuously manufactured by continuously sandwiching a resin sheet between dies provided on a pair of conveyors as in the conventional processes. Accordingly, the present invention provides means for effectively producing a three-dimensional structure with fine long protrusions on both surfaces in a continuous manner by employing means for moving dies provided on conveyors in the direction perpendicular to the resin sheet.

DESCRIPTION OF THE PREFERRED EMBODIMENTS

Figure 1:
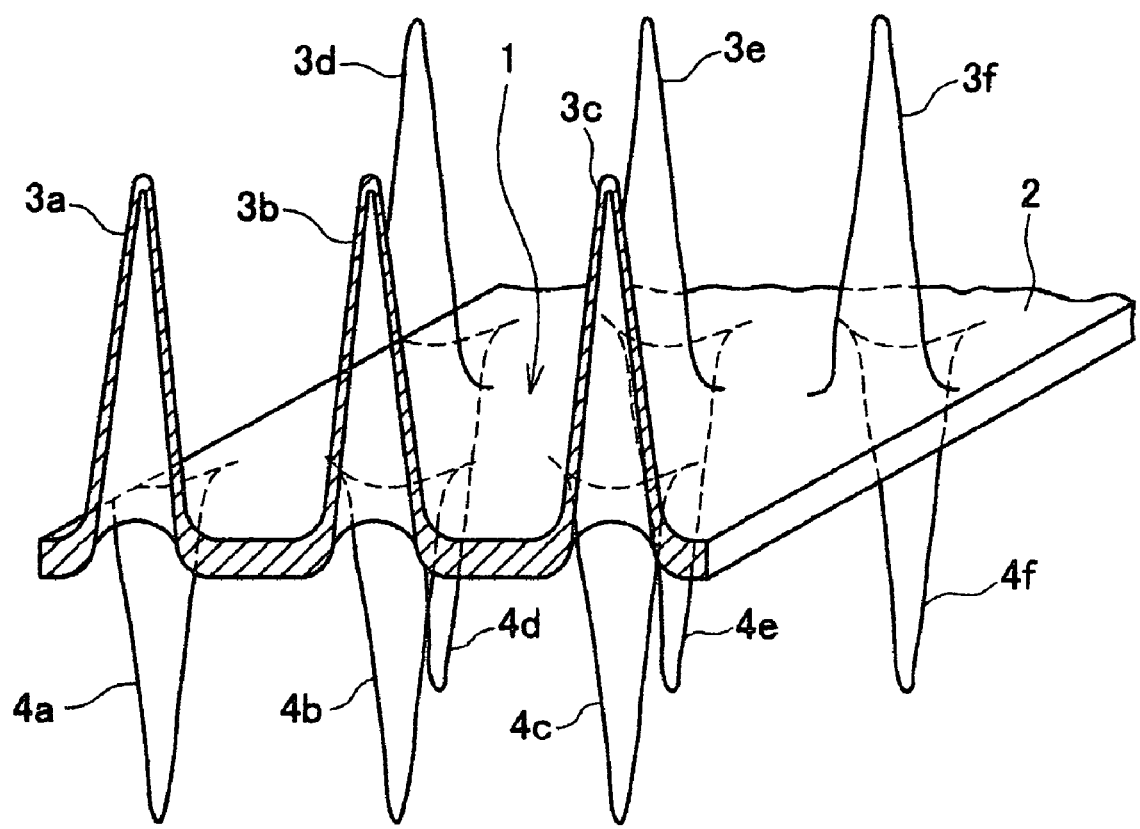
FIG. 1 is a perspective view illustrating an example of the three-dimensional structure by the present invention.

An example of the present invention will be described below based on embodiments thereof illustrated by the appended drawings. FIG. 1 is a perspective view of part of the three-dimensional structure in accordance with the present invention, this structure comprising a multiplicity of needle-like protrusions 3a, 3b, 3c, . . . directed upward and a multiplicity of needle-like protrusions 4a, 4b, 4c, . . . directed downward from a resin sheet 2. The upward needle-like protrusions 3a, 3b, 3c are arranged with a constant pitch p in the lateral direction, and the rear needle-like protrusions 3d, 3e, 3f are located behind the row comprising the needle-like protrusion 3a at a constant pitch p therefrom and arranged with a constant pitch p in the lateral direction. The needle-like protrusions 4a, 4b, 4c protruding downward are arranged with a constant pitch p in the lateral direction in positions shifted by a pitch p/2 backward and by p/2 in the lateral direction from the upward needle-like protrusions 3a, 3b, 3c. The rear needle-like protrusions 4d, 4e, 4f are located behind the row comprising the needle-like protrusion 4a at a constant pitch p therefrom and arranged with a constant pitch p in the lateral direction.

Figure 2:
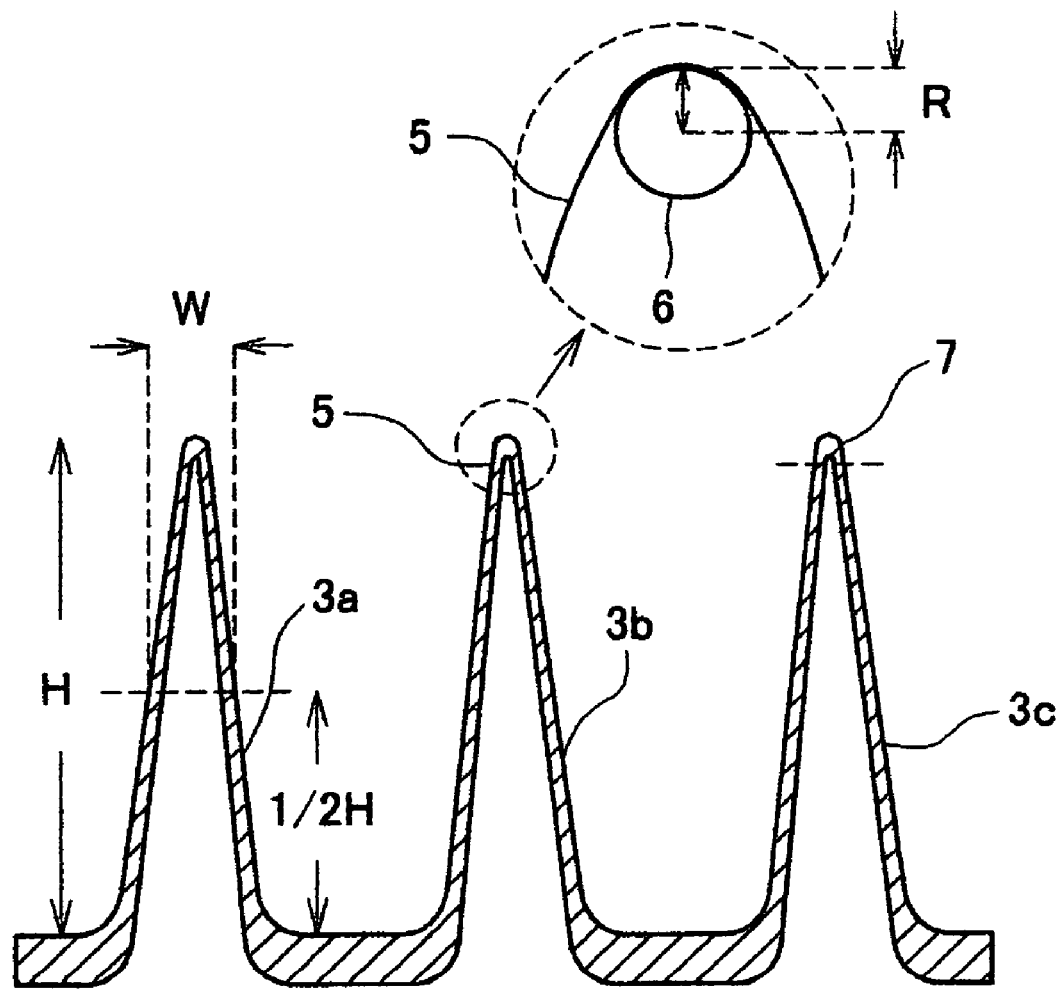
FIG. 2 is a side view illustrating some of the needle-like protrusions shown in FIG. 1.

FIG. 2 is a side view showing only the needle-like protrusions 3a, 3b, 3c presented in FIG. 1. The needle-like protrusions are shown to have a height H and a width W at ½ height of the protrusion, those dimensions being shown at the needle-like protrusion 3a as an example. The curvature radius of the tip portion 5 of the protrusions is shown for the needle-like protrusion 3b as an example. As shown on an enlarged scale in a circle represented by a dot line, a circle 6 inscribed in the surface of the tip portion 5 is considered as a curvature circle and the radius R thereof is called a curvature radius. Furthermore, an example of the structure in which a tip 7 of the protrusion is sliced out and a hole is opened in the tip of the protrusion is shown at the needle-like protrusion 3c as an example. The hole can be also obtained by melting and removing the tip end section or by punching a small hole in the tip portion with a needle-like object.

Figure 3:
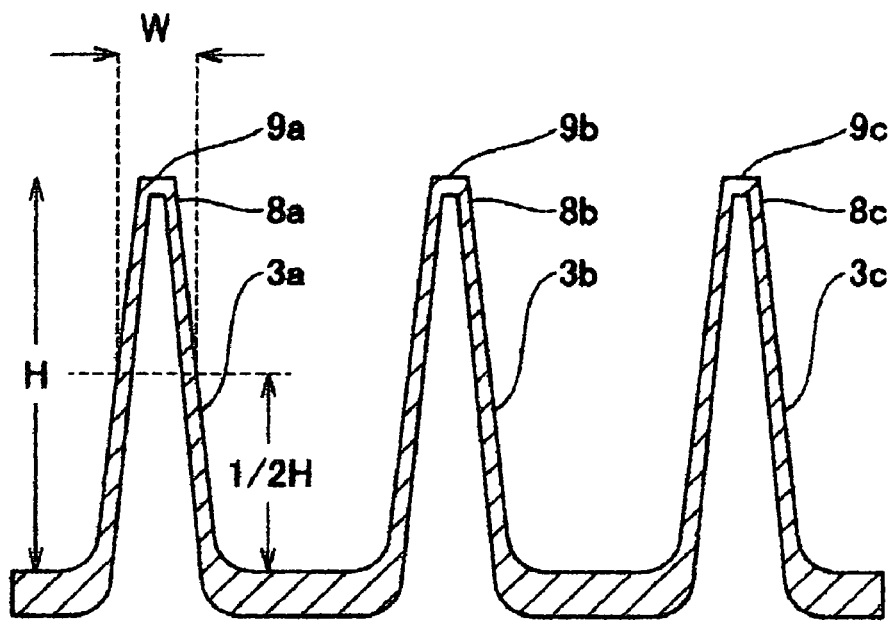
FIG. 3 is another example of the side view illustrating some of the needle-like protrusions shown in FIG. 1.

FIG. 3 shows an example in which the tip end portions 8a, 8b, 8c of the needle-like protrusions 3a, 3b, 3c are constituted by flat portions 9a, 9b, 9c. This flat configuration enlarges the joining surface and increases the joining strength when the three-dimensional structure by the present invention is adhesively bonded to another sheet. This flat portion 9 may have the thickness of the sheet 2, but the thickness thereof is preferably changed so that this portion is thinner than the sheet 2.

Figure 4:
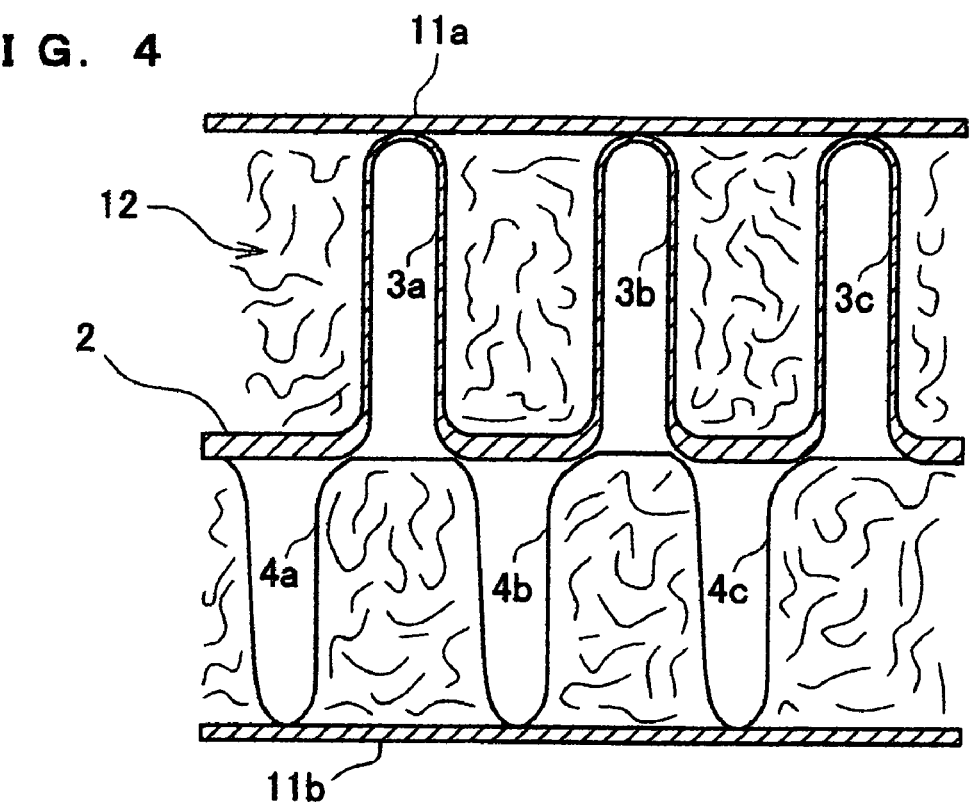
FIG. 4 is a side view illustrating an example in which sheet-like objects were joined to the tips of the three-dimensional structure by the present invention.

FIG. 4 is a side view illustrating an example in which sheet-like objects 11a and 11b are joined to the tips of the needle-like protrusions of the three-dimensional structure 1 shown in FIG. 1. As a result of joining the sheet-like objects 11, when the three-dimensional structure is compressed, all the needle-like protrusions uniformly receive the compression force. Therefore, the compressive strength is greatly increased. Furthermore, the flexural strength is also increased significantly because the tensile strength and compressive strength of the sheet-like objects 11 provide for resistance to bending. Using nonwoven fabric, net-like objects, or perforated films for the sheet-like object 11 can ensure air and water permeability and make it possible to provide the structure with functions of a filter or drainage material. Filling the internal spaces in the three-dimensional structure with a fibrous substance 12 can further improve functions thereof as a material for filters, drainage, and reaction tanks.

Figure 5:
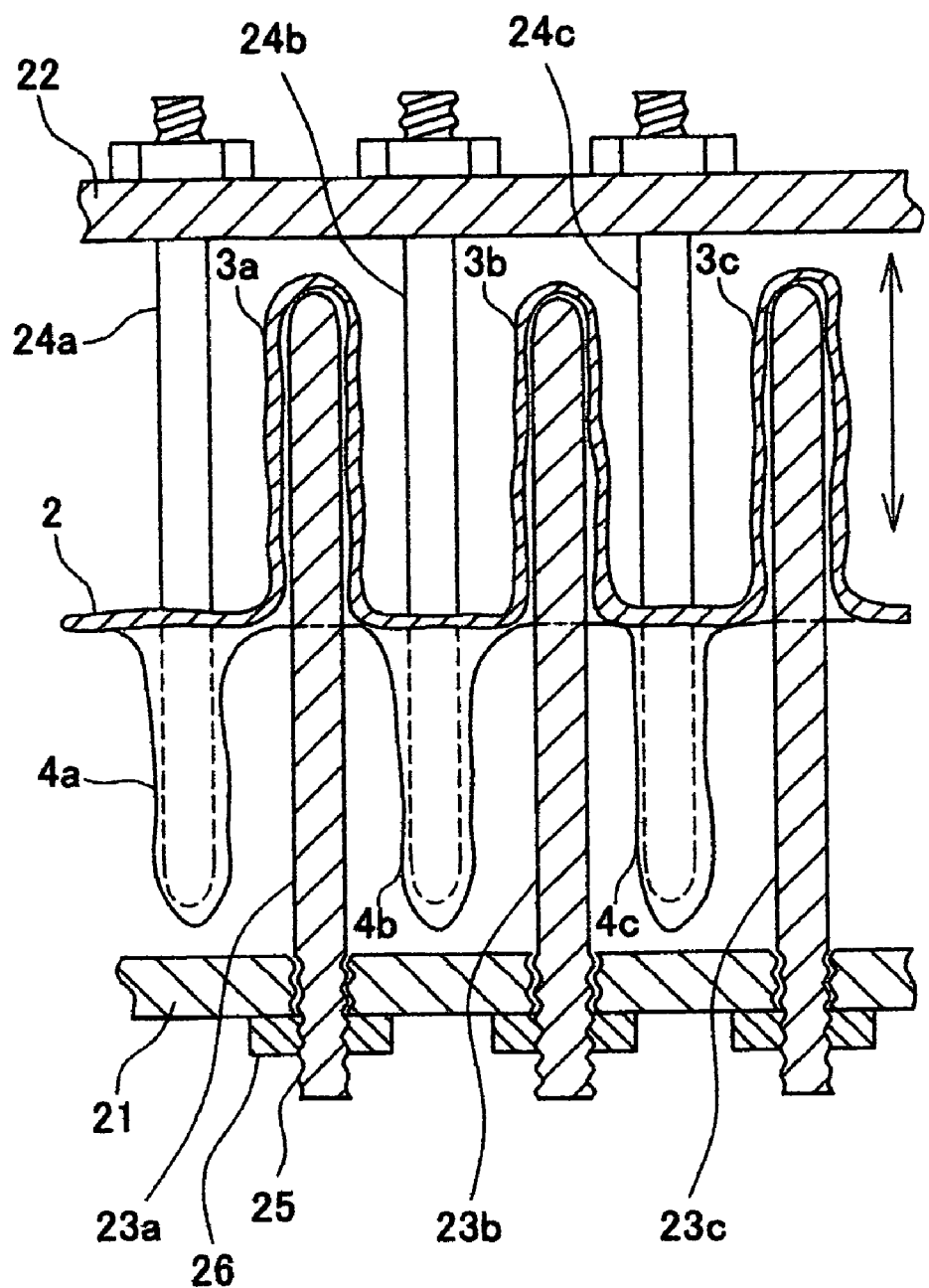
FIG. 5 illustrates an example of the method for the manufacture of the three-dimensional structure in accordance with the present invention and shows some of the manufacturing means in a side view.

FIG. 5 is a side view showing part of an apparatus illustrating an example of the method for the manufacture of the three-dimensional structure 1 by the present invention. In a substrate 21, needle-like dies 23a, 23b, 23c have threaded portions 25 and are fixed to the substrate with nuts 26. The needle-like dies 23a, 23b, 23c are only some of the dies; thus a multiplicity of the needle-like dies are arranged with a constant pitch in the lateral direction and longitudinal direction (as shown in the figure) on the plane of the substrate 21. A plane of a substrate 22 is disposed on the upper surface of the substrate 21, facing the plane thereof and mating therewith, and needle-like dies 24a, 24b, 24c are fixed to the plane of the substrate 22. The mutual arrangement of the needle-like dies 24a, 24b, 24c and the needle-like dies of the substrate 21 is such that the former are disposed in positions shifted by ½ pitch in the lateral and longitudinal directions. Furthermore, a sheet 2 of a molten resin at a temperature equal to or higher than the deflection temperature under load is introduced between the substrate 21 and substrate 22. By contrast with the substrate 21, which is fixed, the substrate 22 can move in the vertical direction, thereby moving the needle-like dies 23a, 23b, 23c and needle-like dies 24a, 24b, 24c, which are parallel thereto, with respect to each other. Such a parallel movement forms the needle-like protrusions 3a, 3b, 3c, 4a, 4b, and 4c. FIG. 5 shows a state in which the substrate 22 assumed the lowermost position. After the protrusions of a constant surface area are formed in the sheet 2 by one stroke of a vertical movement of the substrate 22, the substrate 22 assumes the uppermost position, moves, and the adjacent next row of needle-like protrusions of a constant surface are formed by the subsequent movement of the substrate 22 in the vertical direction. A three-dimensional structure having a multiplicity of needle-like protrusions is continuously formed by repeating such operations of forming protrusions with a constant surface area by vertical strokes of the substrate 22. The vertical strokes of the substrate 22 can be implemented by using a vertical movement induced with an air cylinder or hydraulic cylinder or a vertical movement created by employing a cam. The needle-like protrusions 3 and 4 in accordance with the present invention have a high deformation ratio, a large surface area, and a high cooling efficiency. Therefore, the productivity is increased. However, holes can be provided in the substrates 21 and 22 and cooling air can be introduced therein for additional increase in cooling efficiency.

Figure 6:
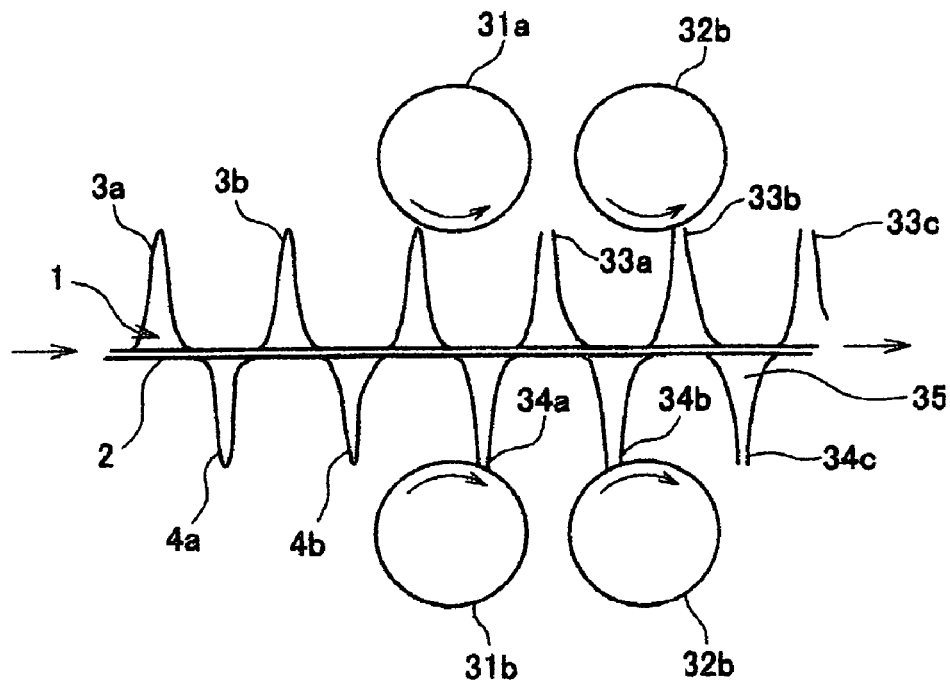
FIG. 6 is a side view illustrating schematically a process employing an example of means for opening holes in the tips of the needle-like protrusions in accordance with the present invention.

FIG. 6 shows means for making holes in the tips of the needle-like protrusions of the three-dimensional structure by the present invention. Thus, a set of heating rolls 31a, 31b is provided in the advance direction of the three-dimensional structure 1 having the needle-like protrusions 3a, 3b, . . . , 4a, 4b, . . . on both sides of the resin sheet 2, those rolls are brought into contact with the tips of the needle-like protrusions 3, 4, the tips of the needle-like protrusions 3, 4 are melted and removed, and subsequent cooling with a set of cooling rolls 32a, 32b produces a three-dimensional structure 35 having holes 33a, 33b, . . . , 34a, 34b in the tips. A heating conveyor, hot-air flow, or torches can be used in place of the heating rollers 31, but in all the cases the temperature is preferably 30-50° C. higher than the melting point (in the case of amorphous polymers, the secondary transition temperature) of the resin sheet, and a high temperature which is at least 100° C. higher than the melting point is especially preferred.

Figure 7:
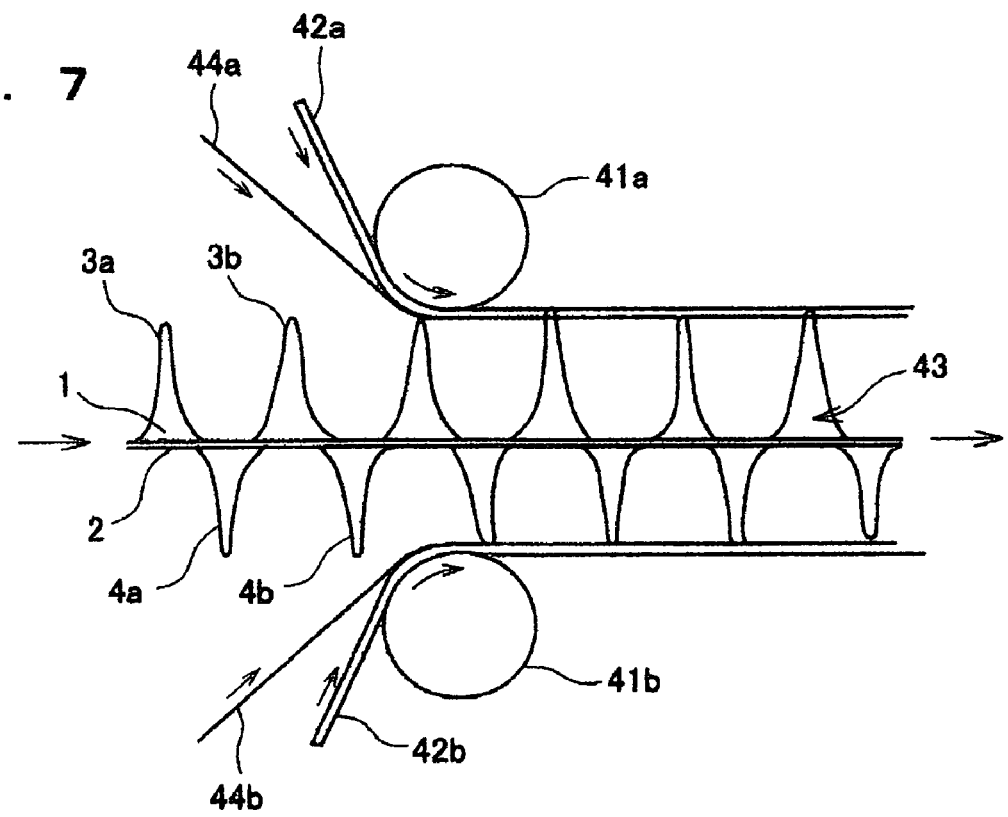
FIG. 7 is a side view illustrating schematically a process employing an example of means for joining sheet-like objects to the tips of the three-dimensional structure by the present invention.

FIG. 7 shows means for joining the sheet-like objects to the three-dimensional structure 1 by the present invention. Thus, a set of heating rolls 41a, 41b is provided in the advance direction of the three-dimensional structure 1 having the needle-like protrusions 3a, 3b, . . . , 4a, 4b on both sides of the resin sheet 2, the sheet-like objects 42a, 42b are guided to those rolls, heated with the heating rolls 41, softened, brought into contact with the tips of needle-like protrusions 3, 4, and joined to the tips of the needle-like protrusions 3, 4, thereby producing a three-dimensional structure 43 joined to the sheet-like objects. The heating rolls 41 are not required to be heated to a very high temperature, by contrast with the heating rolls 31 shown in FIG. 6, but they have to provide the sheet-like objects 42 with heat sufficient for joining. Furthermore, when the sheet-like objects 42 are the molten resin sheets released from T dies, the rolls rather have to be at a temperature such that the molten resin is cooled. In the case where the sheet-like objects 42 change their properties under heating, as microporous films or nonwoven fabrics, or when they are difficult to join by heating alone, as knitted products or nets, the temperature of the heating rolls is difficult to increase. Therefore, adhesive webs 44a, 44b can be introduced between the three-dimensional structure 1 and sheet-like objects 42 and adhesive boding can be implemented with the adhesive webs 44. When the sheet-like objects 42 feature good air and water permeability, like microporous films and nonwoven fabrics, the adhesive web 44 is preferred to be in the form of nonwoven fabric or a net-like object so that the air permeability thereof is not lost. Furthermore, when air permeability of the adhesive webs 44 is low, joining is preferably conducted by disposing the adhesive webs 44 locally in the form of stripes, rather than on the entire surface of the sheet-like objects 42. Furthermore, a three-dimensional structure 43 with sheet-like objects joined thereto can be also manufactured by applying an adhesive to the joining surface of the sheet-like objects 42 or the tips of the needle-like protrusions 3, 4 of the three-dimensional structure 1, without using the adhesive webs 44.

Figure 8:
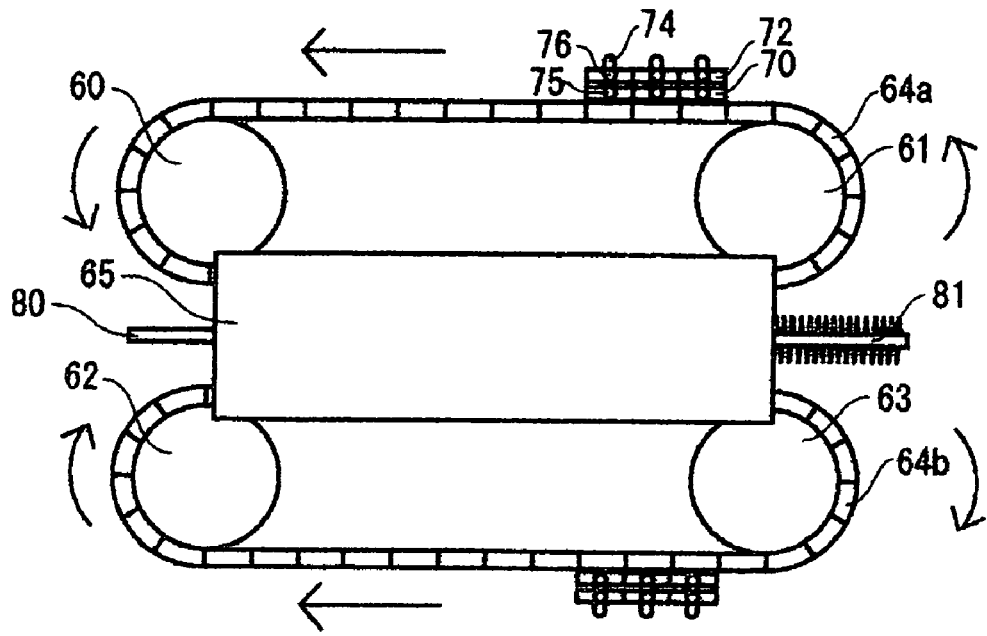
FIG. 8 is a side view of a continuous manufacturing apparatus in accordance with the present invention.

FIGS. 8 to 12 illustrate examples of continuous manufacture of the three-dimensional structure in accordance with the present invention. FIG. 8 is a side view of the entire apparatus. A caterpillar 64a is used as a conveyor continuously circulating between the rolls 60, 61, and a caterpillar 64b facing the caterpillar 64a circulates between the rollers 62, 63. The caterpillars 64 have a multiplicity of vertical pins 74 projecting therefrom with a fixed spacing (only some of them are shown in the figure). The caterpillars are produced by using multiple substrates 70 having multiple needle-like protrusions (not shown in the figure) on the surface shown in FIG. 5, forming openings in the substrates, and inserting and fixing the vertical pins 74. A resin sheet 80 serving as a starting material is molded with part of a grooved cam 65 and becomes the three-dimensional structure 81.

Figure 9:
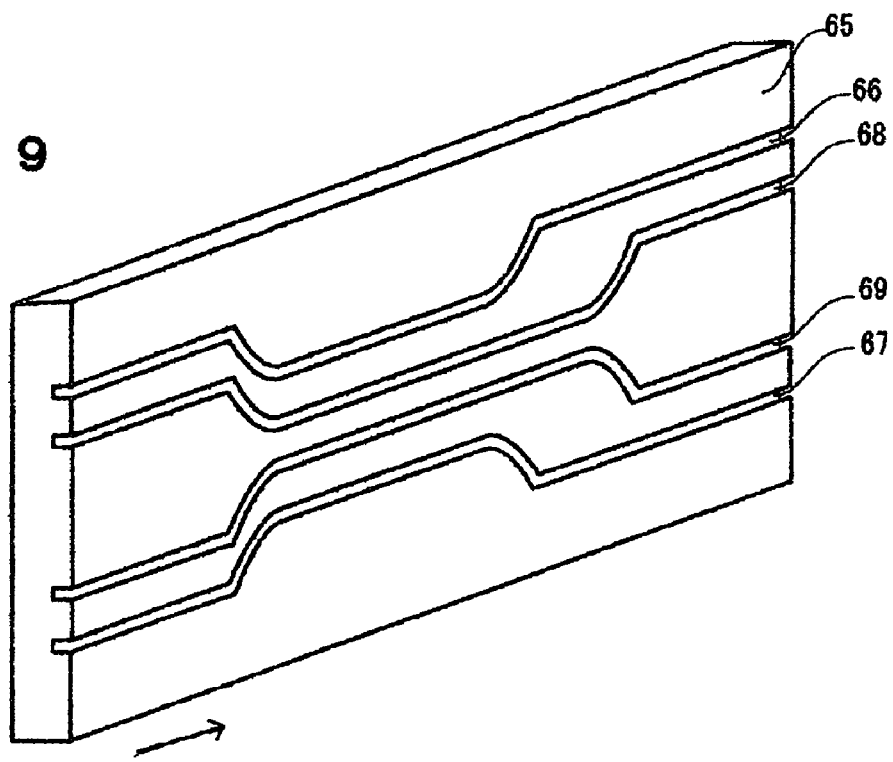
FIG. 9 is a perspective view of a grooved cam portion shown in FIG. 8.
Figure 10:
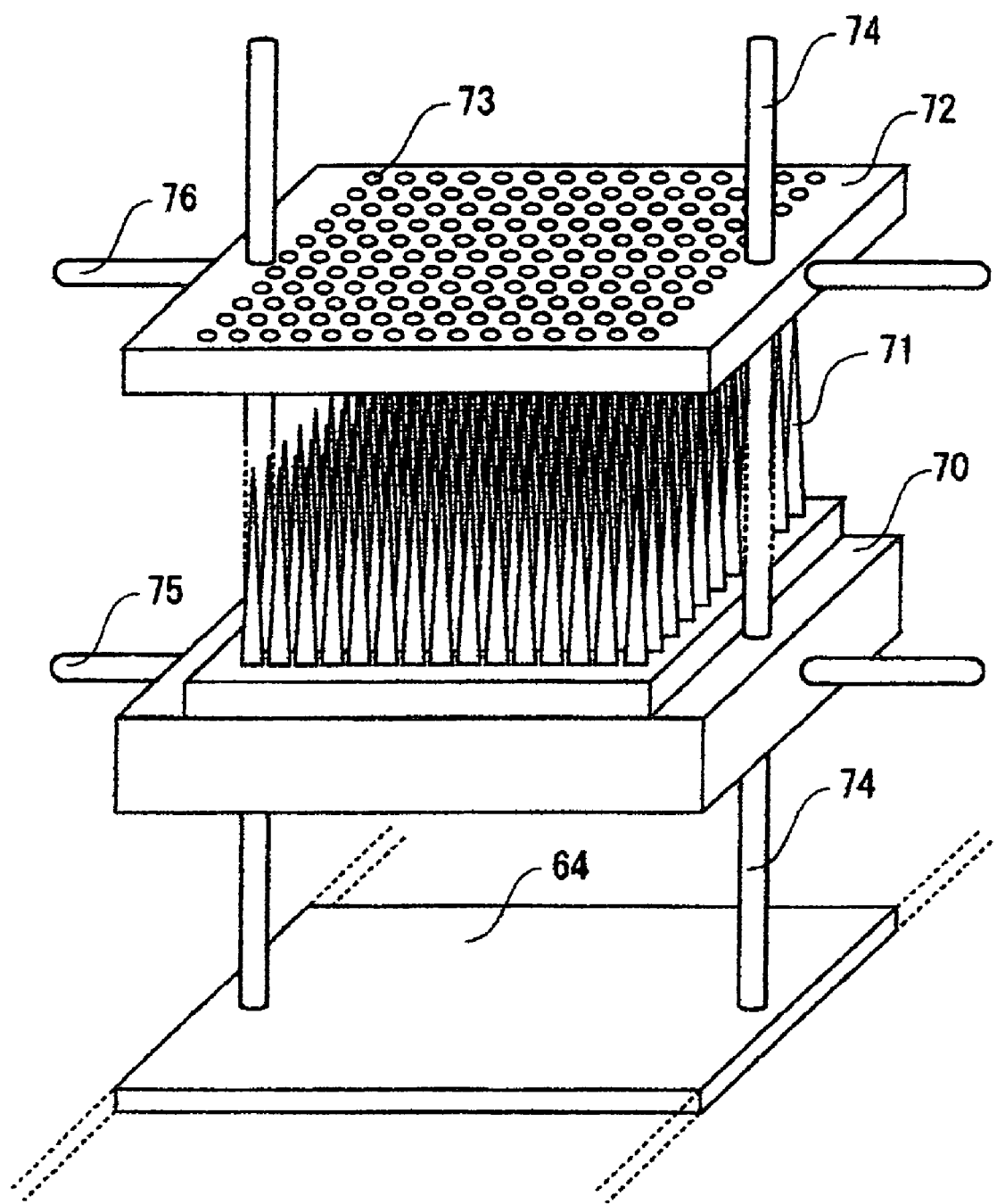
FIG. 10 is a cross-sectional view of the apparatus shown in FIG. 8.

FIGS. 9 and 10 are perspective views of components of the manufacturing apparatus by the present invention. FIG. 9 shows the grooved cam 65 and illustrates a state in which guide grooves 66, 67 for substrates and guide grooves 68, 69 for parting plates are formed in a plate. FIG. 10 shows the caterpillar 64, vertical pins 74 standing thereon, a substrate 70 provided with a plurality of needle-like dies 71, a parting plate 72 having through holes 73 for needle-like dies, those holes corresponding to the needle-like dies 71, pins 75 for substrates that are provided on the side surface of the substrate 70, and pins 76 for parting that are provided on the side surface of the parting plate 72. When the pins 75 for the substrate and pins 76 for the parting plate are guided by respective grooves of the grooved cam 65 shown in FIG. 9, the substrates 70 provided on the upper and lower caterpillars 64a, 64b move in the direction perpendicular to the resin sheet 80 (parallel to the upper and lower needles) and pass through the resin sheet 80, thereby forming the three-dimensional structure 81. In the course of separation after the approach, the upper and lower guide grooves 66, 67 for substrates and the guide grooves 68, 69 for parting plates shown in FIG. 9 provide for a path different from that in the case of approach in order to facilitate the separation of the molded three-dimensional structure 81 from the needle-like dies of the substrate.

Figure 11:
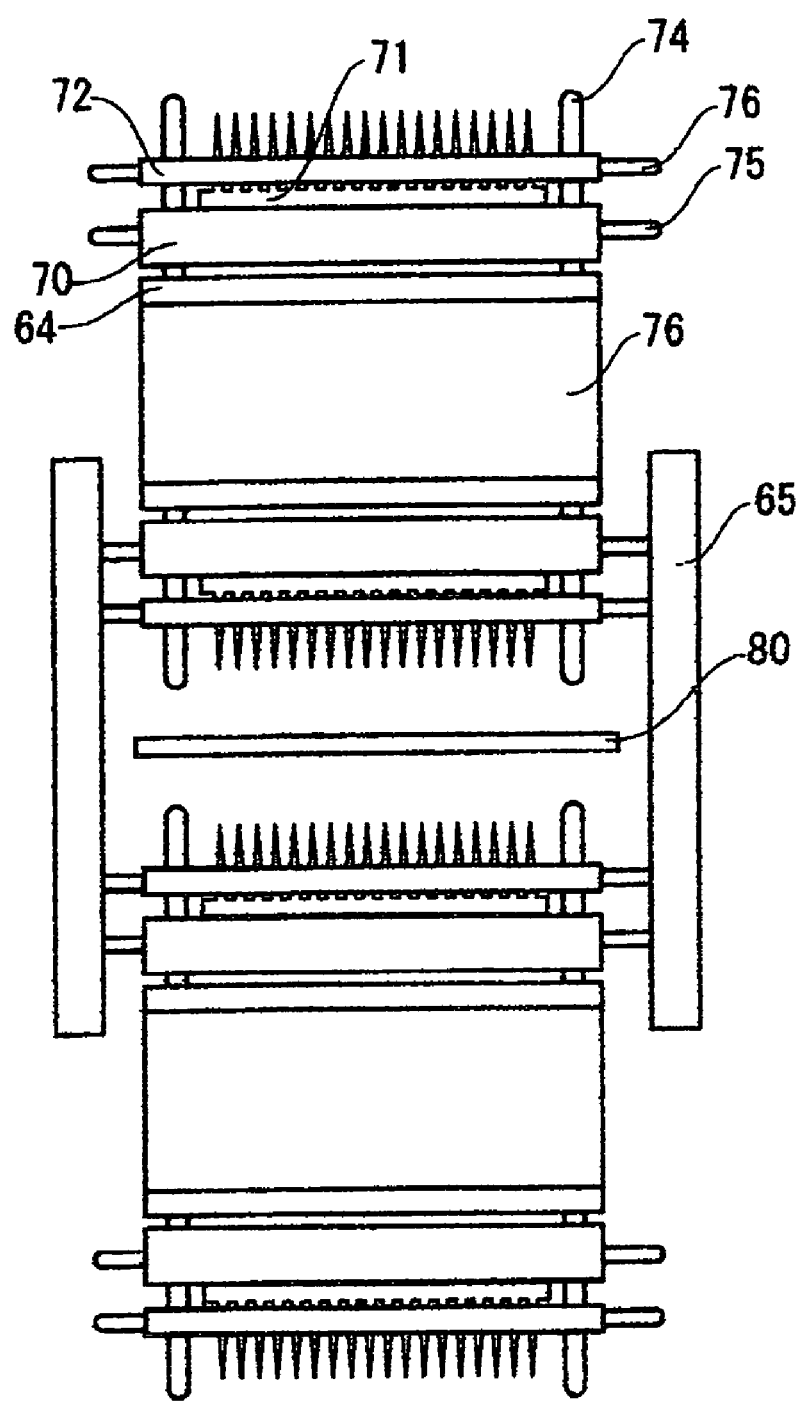
FIG. 11 is a perspective view of a molding member of the apparatus shown in FIG. 8.

FIG. 11 is a cross-sectional view from the front surface illustrating the entire apparatus shown in FIG. 8. This view illustrates the arrangement of the grooved cam 65, caterpillars 64, vertical pins 74 standing thereon, substrate 70 provided with multiple needle-like dies 71, parting plates 72, pins 75 for substrate that are provided on the side surface of the substrate 70, and pins 76 for separation that are provided on the side surface of the parting plate 72.

Figure 12:
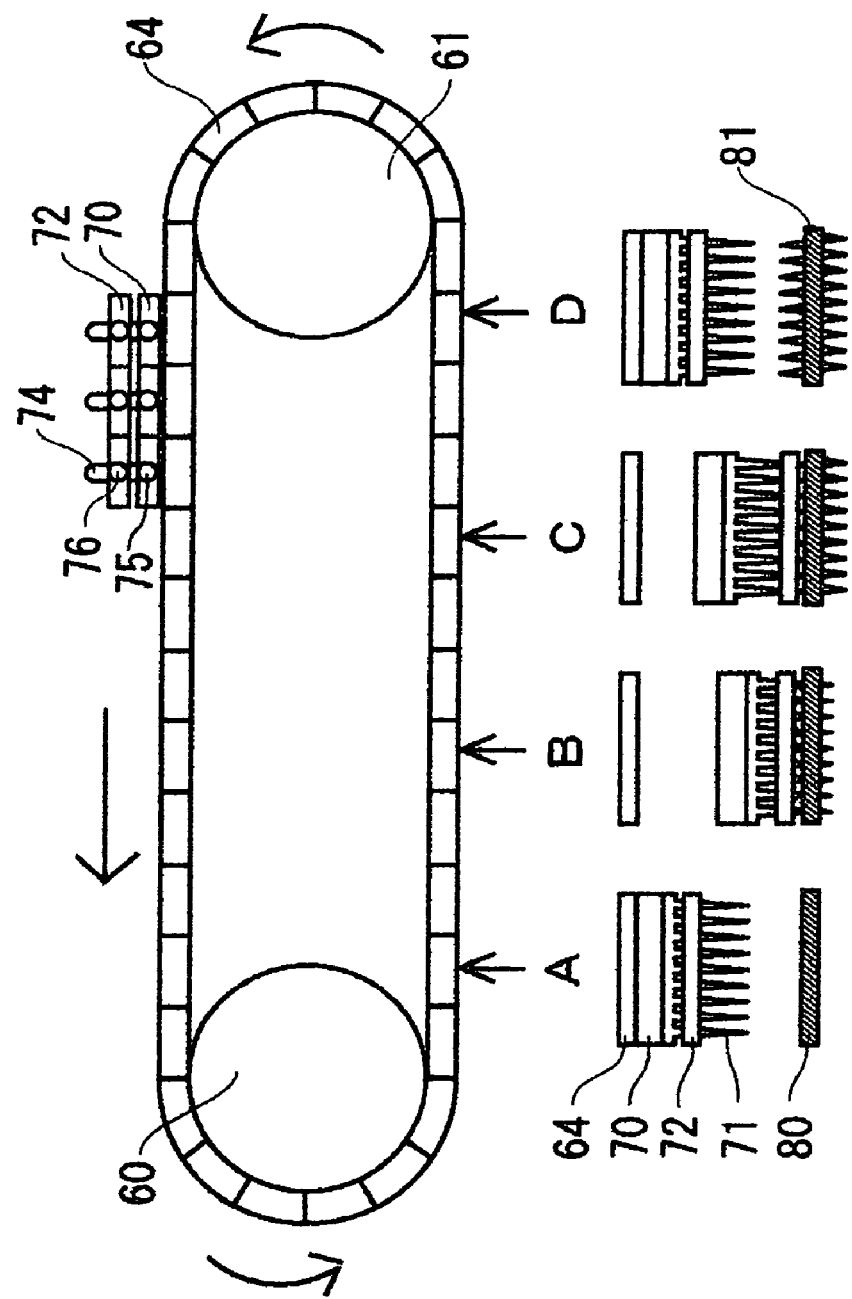
FIG. 12 is a schematic drawing illustrating the molding process relating to FIG. 8.

FIG. 12 shows a portion of the grooved cam 65 of the entire structural drawing of the apparatus shown in FIG. 8 and illustrates how the needle-like dies 71 provided in a vertical condition on the substrate 70 and the parting plate 72 act on the resin sheet 80 serving as a starting material. In step A, in the inlet portion of the grooved cam 65, both the needle-like dies 71 attached to the substrate 70 and the parting plates 72 are separated from the resin sheet 80. In step B, the lower and upper needle-like dies 71 move perpendicularly to the resin sheet 80 and thrust the resin sheet 80. In step C, first, the needle-like dies 71 are separated from the molded three-dimensional structure 81, but the parting plate 72 still remains on the side of the molded three-dimensional structure 81. In step D, the parting plate 72 is also separated from the three-dimensional structure 81. Such a perpendicular movement of the substrate 70 and parting plate 72 with respect to the resin sheet is carried out along the trajectories of the guide grooves 66, 67 for substrates and guide grooves 68, 69 for parting plates provided in the grooved cam 65.

Figure 13:
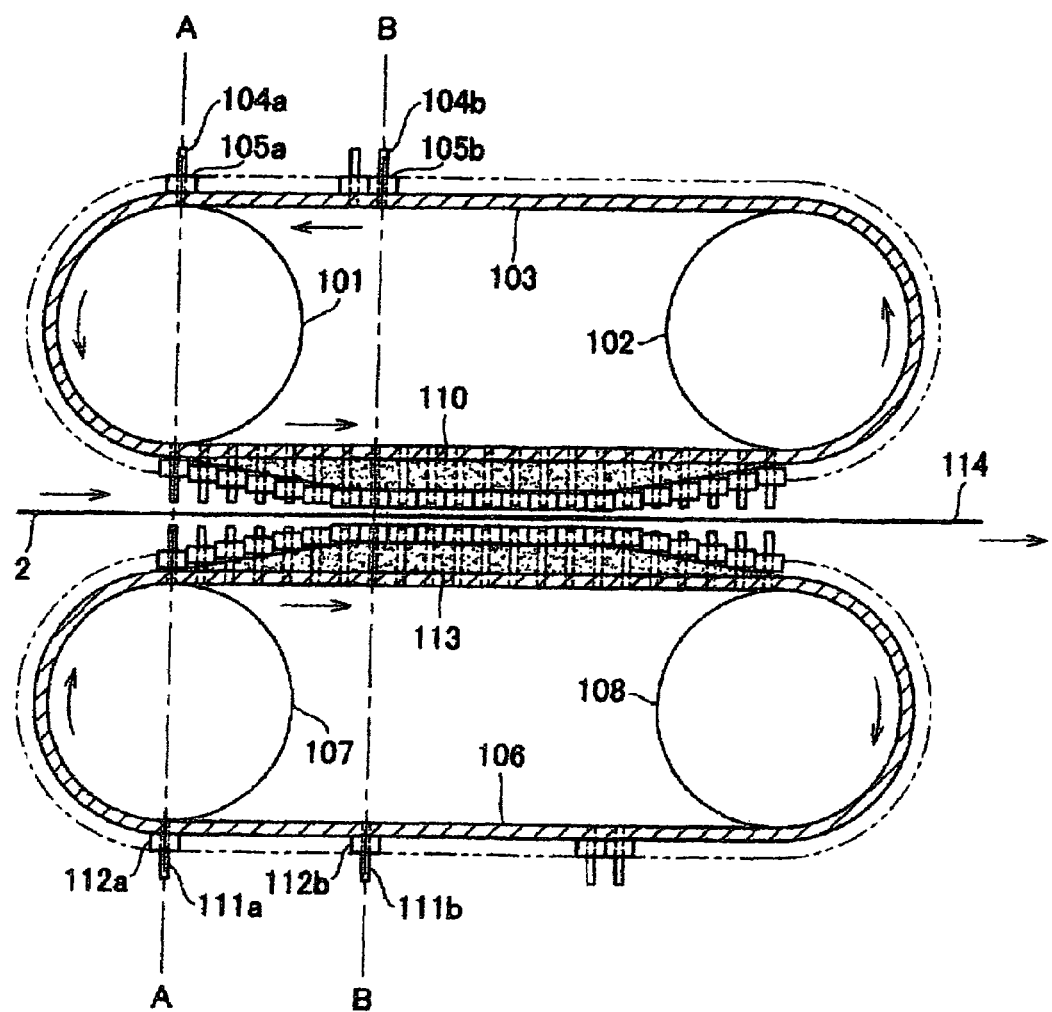
FIG. 13 is a side view of another continuous manufacturing apparatus in accordance with the present invention.
Figure 14:
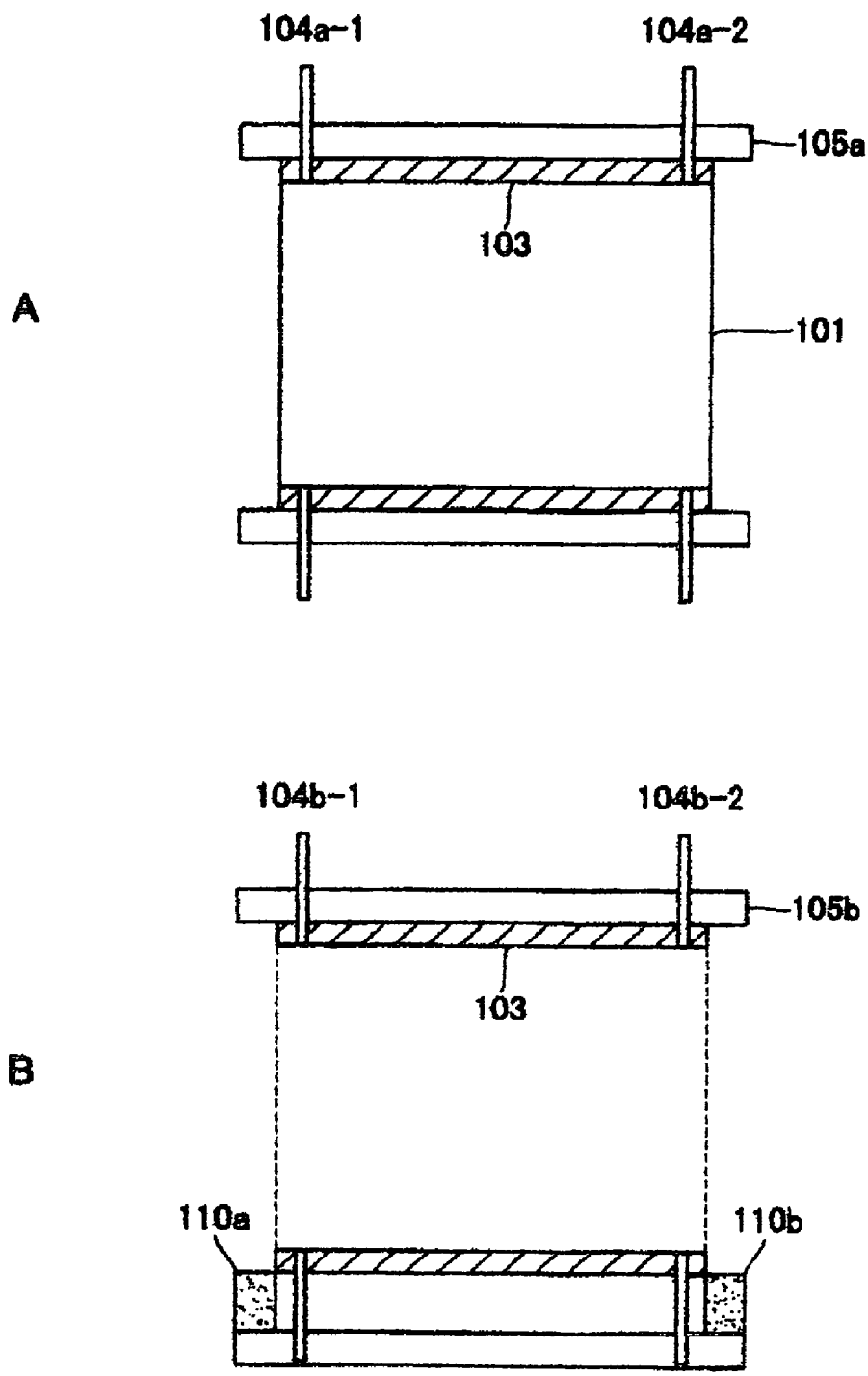
FIG. 14 is a cross-sectional view of the apparatus shown in FIG. 13.

FIGS. 13 and 14 illustrate another means for continuously molding the sheet-like objects of the three-dimensional structure 1 by the present invention. FIG. 13 is a side view taken from the lateral direction of the apparatus, and FIG. 14 shows A-A and B-B cross-sectional views of the structure shown in FIG. 13. A conveyor 103 circulates between the rolls 101, 102. Multiple pins 104a, 104b (only some of them are shown in the figure to facilitate understanding) are provided in a vertical condition with a constant spacing on both end sections of the conveyor 103. Substrates 105a, 105b having multiple needle-like protrusions (not shown in the figure) on the surface shown in FIG. 5 have holes on both end portions thereof and are fixed to the pins 104 of the conveyor 103 via those holes. The conveyor 103 is preferably magnetized with a magnetic rubber, magnetic plastic, or other means having magnets embedded therein, and the substrates 105 are fixed to the conveyor 103 by using magnetic properties of the conveyor 73. When the conveyor 103 and a conveyor 106 forming in the lower part thereof a pair with the conveyor 103 and circulating at the same speed come close to each other, while facing each other, the substrates 105 are separated from the surface of the conveyor 103 by the rising slope of a stand 110 sloped in the front and rear sections thereof and the substrates move gradually up along the pins 104 in the direction perpendicular to the direction of the resin sheet 2 serving as a starting material. Then, after passing through the section where they move parallel to the conveyor 103, the substrates are again caused to move to the conveyor 103 by the declining slope of the stand 110.

The conveyor 106 forming a pair with the conveyor 103 circulates at the same speed as the conveyor 103 between the rolls 107, 108 and similarly has multiple pins 111a, 111b and multiple substrates 112a, 112b fixed thereto. The pins 111 and substrates 112 of the conveyor 106 circulating in pair with the conveyor 103 are similarly pushed up by the stand 113 and move perpendicularly to the resin sheet 2. As a result of such perpendicular movement of the substrate 105 and substrates 112, the needles of the needle-like protrusions (not shown in the figures) provided on the substrates 105, 112 move parallel to each other via the resin sheet 2 traveling between the substrates, the needles thrust the resin sheet 2, and a sheet 114 having needle-like protrusions on both surfaces of the resin sheet 2 is obtained. In the figure, a thermostat or a heating unit for the resin sheet 2, which is to be inserted, are not shown. Furthermore, a cooling unit for the resin sheet subjected to piercing with the needle-like protrusion of the substrate is also not shown. FIG. 10 shows an example in which the substrates 105, 112 of the two groups moved vertically, but vertical movement may be performed only by one group, for example, by substrates 112.

FIG. 14A is a sectional view along A-A in FIG. 13, and FIG. 14B is a sectional view along B-B. The two figures illustrate only the upper part of the apparatus shown in FIG. 13. The stand 110 is disposed on the outside of the conveyor 113. A guide rail can be provided on the conveyor 103 on the opposite side from the stand 110 shown in FIG. 13 so as to push down the substrates 105 when the substrates 115 return to the conveyor 103. In order to reduce friction, the stand and guide rail preferably comprise small rollers or bearings. Furthermore, materials with a low friction coefficient or a lubricant can be used.

EXAMPLE 1

High-density polyethylene (manufactured by Japan Polyolefin Co., Ltd., J-REX☐HD, KL371A, MFR 1.0, density 0.956 g/cm3, deflection temperature under load 65° C.) was used as a starting material resin. This resin was extrusion molded at 275° C. from a T die, and guided to a three-dimensional structure molding process shown in FIG. 5, so as to obtain a sheet with a thickness of 300 μm in a molded state. Two sets of molds combining four commercial pinholders for IKEBANA (flower arrangement) were used as the substrates 21, 22 and needle-like dies 22, 23 shown in FIG. 5. The diameter of the needle-like dies of the pinholders was 1.35 mm, the pitch was 3.7 mm, and the height was 13 mm. Those two molds were set so that the tips thereof faced each other, a molten resin sheet molded from a T die was sandwiched between the molds, and the needle-like dies were engaged so as to thrust the resin sheet. The temperature of the molten resin sheet at this time was 232° C. A molding cooled by the air and thermal capacity of the needle-like dies was removed from the molds and the three-dimensional structure shown in FIG. 1 was obtained. The height H of the three-dimensional structure was 5.1 mm, the width W at ½ H was 1.5 mm, and the pitch between adjacent needle-like protrusions was 3.7 mm.

INDUSTRIAL APPLICABILITY

The three-dimensional structure in accordance with the present invention excels in pressure resistance, despite being flexible, and has good water permeability and thermal insulating properties. It is suitable for buffer sheets, cushion sheets, partition wall, and floors.

What is claimed is:

1. A method for the manufacture of a three-dimensional structure, wherein a multiplicity of needle-like dies are provided so as to be integrated with a substrate, a multiplicity of said substrates are linked together and fixed to continuously circulating conveyors, a pair of the conveyors travels opposing each other so that a pair of said substrates travel opposing each other, a resin sheet heated to a temperature equal to or higher than the deflection temperature under load is continuously inserted between said pair of continuously circulating conveyors, said pair of substrates are vertically moved with respect to said resin sheet, and needle-like protrusions are continuously formed on both sides of said resin sheet by causing said pairs of needle-like dies to thrust said resin sheet, wherein:

said conveyors comprise caterpillars, said substrates are fixed to vertical pins standing on said caterpillars, and said vertical movement is carried out by guiding the substrate support pins provided on the side surface of said substrate with a grooved cam; and separation plate support pins provided on the side surface of separation plates having holes on positions corresponding to said needle-like dies protrusions on each surface of said pair of substrates are guided by a grooved cam on a track other than said substrate, and said substrates and the molded resin sheet are continuously separated by said separation plates.

2. An apparatus for the manufacture of a three-dimensional structure, wherein a multiplicity of needle-like dies are provided so as to be integrated with a substrate, a multiplicity of said substrates are linked together and fixed to continuously circulating conveyors, a pair of the conveyors are disposed such that they travel opposing each other so that a pair of substrates travel opposing each other, a resin sheet heated to a temperature equal to or higher than the deflection temperature under load is formed so as to be continuously inserted between said pair of continuously circulating conveyors, and using a mechanism in which the pair of substrates are vertically moved with respect to the resin sheet, needle-like protrusions are continuously formed on both sides of said resin sheet by causing said pairs of needle-like dies to thrust said resin sheet, wherein:

said conveyors comprise caterpillars, said substrates are fixed to vertical pins standing on said caterpillars, and said vertical movement is carried out by guiding the substrate support pins provided on the side surface of said substrate with a grooved cam; and there are provided separation plates having holes on positions corresponding to said needle-like dies protrusions on each surface of said pair of substrates, separation plate support pins provided on the side surface of said separation plates are guided by a grooved cam on a track other than said substrate, and said substrates and the molded resin sheet are continuously separated.

3. An apparatus for the manufacture of a three-dimensional structure, wherein a multiplicity of needle-like dies are provided so as to be integrated with a substrate, a multiplicity of said substrates are linked together and fixed to continuously circulating conveyors, a pair of the conveyors are disposed so as to travel opposing each other so that a pair of said substrates travel opposing each other, a resin sheet heated to a temperature equal to or higher than the deflection temperature under load is formed so as to be continuously inserted between said pair of continuously circulating conveyors, and using a mechanism in which the pair of substrates are vertically moved with respect to the resin sheet, needle-like protrusions are continuously formed on both sides of said resin sheet by causing said pairs of needle-like dies to thrust said resin sheet, wherein:

pins are vertically provided on said conveyors, said substrate is fixed on said conveyors by the pins piercing holes provided on said substrate, and said vertical movement of said substrate is carried out by mounts provided on both sides of said conveyor;

and there are provided separation plates having holes on positions corresponding to said needle-like dies protrusions on each surface of said pair of substrates, said separation plates are guided by a mount with a track other than said substrate, and said substrates and the molded resin sheet are continuously separated.

4. An apparatus for the manufacture of a three-dimensional structure, wherein a multiplicity of needle-like dies are provided so as to be integrated with a substrate, a multiplicity of said substrates are linked together and fixed to continuously circulating conveyors, a pair of the conveyors are disposed such that they travel opposing each other so that a pair of substrates travel opposing each other, a resin sheet heated to a temperature equal to or higher than the deflection temperature under load is formed so as to be continuously inserted between said pair of continuously circulating conveyors, and using a mechanism in which the pair of substrates are vertically moved with respect to the resin sheet, needle-like protrusions are continuously formed on both sides of said resin sheet by causing said pairs of needle-like dies to thrust said resin sheet, wherein:

said conveyors comprise caterpillars, said substrates are fixed to vertical pins standing on said caterpillars, and said vertical movement is carried out by guiding the substrate support pins provided on the side surface of said substrate with a guiding device; and there are provided separation plates having holes on positions corresponding to said needle-like dies protrusions on each surface of said pair of substrates, separation plate support pins provided on the side surface of said separation plates are guided by a grooved cam on a track other than said substrate, and said substrates and the molded resin sheet are continuously separated.

5. An apparatus for the manufacture of a three-dimensional structure, wherein a multiplicity of needle-like dies are provided so as to be integrated with a substrate, a multiplicity of said substrates are linked together and fixed to continuously circulating conveyors, a pair of the conveyors are disposed so as to travel opposing each other so that a pair of said substrates travel opposing each other, a resin sheet heated to a temperature equal to or higher than the deflection temperature under load is formed so as to be continuously inserted between said pair of continuously circulating conveyors, and using a mechanism in which the pair of substrates are vertically moved with respect to the resin sheet, needle-like protrusions are continuously formed on both sides of said resin sheet by causing said pairs of needle-like dies to thrust said resin sheet, wherein:

pins are vertically provided on said conveyors, said substrate is fixed on said conveyors by the pins piercing holes provided on said substrate, and said vertical movement of said substrate is carried out by mounts provided on both sides of said conveyor;

and there are provided separation plates having holes on positions corresponding to said needle-like dies protrusions on each surface of said pair of substrates, said separation plates are guided by a guiding device other than said substrate, and said substrates and the molded resin sheet are continuously separated.

* * * * *